United States Patent [19]

Burke

[11] Patent Number: 5,073,016

[45] Date of Patent: Dec. 17, 1991

[54] LENS SYSTEM FOR COMPACT CAMERA

[75] Inventor: Elliot M. Burke, Santa Barbara, Calif.

[73] Assignee: Medical Concepts, Inc., Goleta, Calif.

[21] Appl. No.: 572,700

[22] Filed: Aug. 27, 1990

[51] Int. Cl.$^5$ ............................................. G02B 17/00
[52] U.S. Cl. .................................................... 359/727
[58] Field of Search ................ 350/442, 443, 444, 445

[56] References Cited

U.S. PATENT DOCUMENTS 4,685,777  8/1987  Hirose ............................. 350/442 X
4,812,028  3/1989  Matsumoto .................... 350/442 X Primary Examiner—Scott J. Sugarman
Attorney, Agent, or Firm—Elliott N. Kramsky

[57] ABSTRACT

A lens system is characterized by a back focal length that substantially exceeds its front focal length. An input lens having a relatively short focal length is arranged to receive an image. The back of the input lens is a mirrored concave surface that is inclined in such a way as to direct the reflected image to a concave mirror. The concave mirror and a Mangin mirror having a convex mirrored back surface form a relay lens system for redirecting the image reflected from the concave mirror to a second point on that mirror from which the image is reflected to a predetermined focal point. The Mangin mirror is arranged to remove chromatic and spherical aberrations from the virtual image. The lenses and mirrors of the system are arranged so that the optical distance from the concave mirror to the predetermined focus is at least three times the focal length of the first lens.

10 Claims, 2 Drawing Sheets

LENS SYSTEM FOR COMPACT CAMERA

BACKGROUND

1. Field of the Invention

The present invention relates to optical systems. More particularly, this invention pertains to an optical system that is adapted to use in a camera of compact design.

2. Description of the Prior Art

Color cameras, particularly those of the full color "three-chip" type that employ three charge-coupled device (CCD) sensors that detect the three narrow band components of a full color image, find many uses. So-called "linear" cameras that use linear CCD's commonly inspect items that are transported by conveyor belts. Linear full color cameras find particular utility in product inspection where product chromaticity provides a significant indication of quality.

Cameras of the above type require beamsplitter arrangements for separating the full color input into three primary color component images for application to the CCD's. Accordingly, a relatively large clear space or back focal length must be provided if one wishes to fit the required optics into a camera unit of useful compact size.

Present-day lens systems are limited in attaining a back focal length that exceeds the focal length of the lens. Accordingly, cameras of the above-described type have commonly employed relatively-long focal length lens systems. Such long focal length systems result in relatively-large and bulky camera assemblies.

SUMMARY OF THE INVENTION

The present invention addresses the foregoing shortcomings of the prior art by providing an improved lens system. Such system includes an input lens which has a focal length and includes a simple lens for receiving an image. Such input lens includes a mirrored back surface that is concave for optically flattening the received image and projecting the virtual image in a predetermined direction. A concave mirror is provided to reflect the flattened virtual image to a Mangin mirror. Such Mangin mirror is positioned in opposed relation to the concave mirror and at the aperture stop of the lens system so that the image is reflected from the back surface thereof to the concave mirror and then reflected therefrom to a predetermined focus.

The foregoing and additional features and advantages of this invention will become further apparent frcm the detailed description that follows. The detailed written description is accompanied by a set of drawing figures. Numerals of the figures, corresponding to those of the written description, point to the features of the invention, like numerals referring to like features throughout both the written description and the drawing figures.

DETAILED DESCRIPTION

Figure 1:
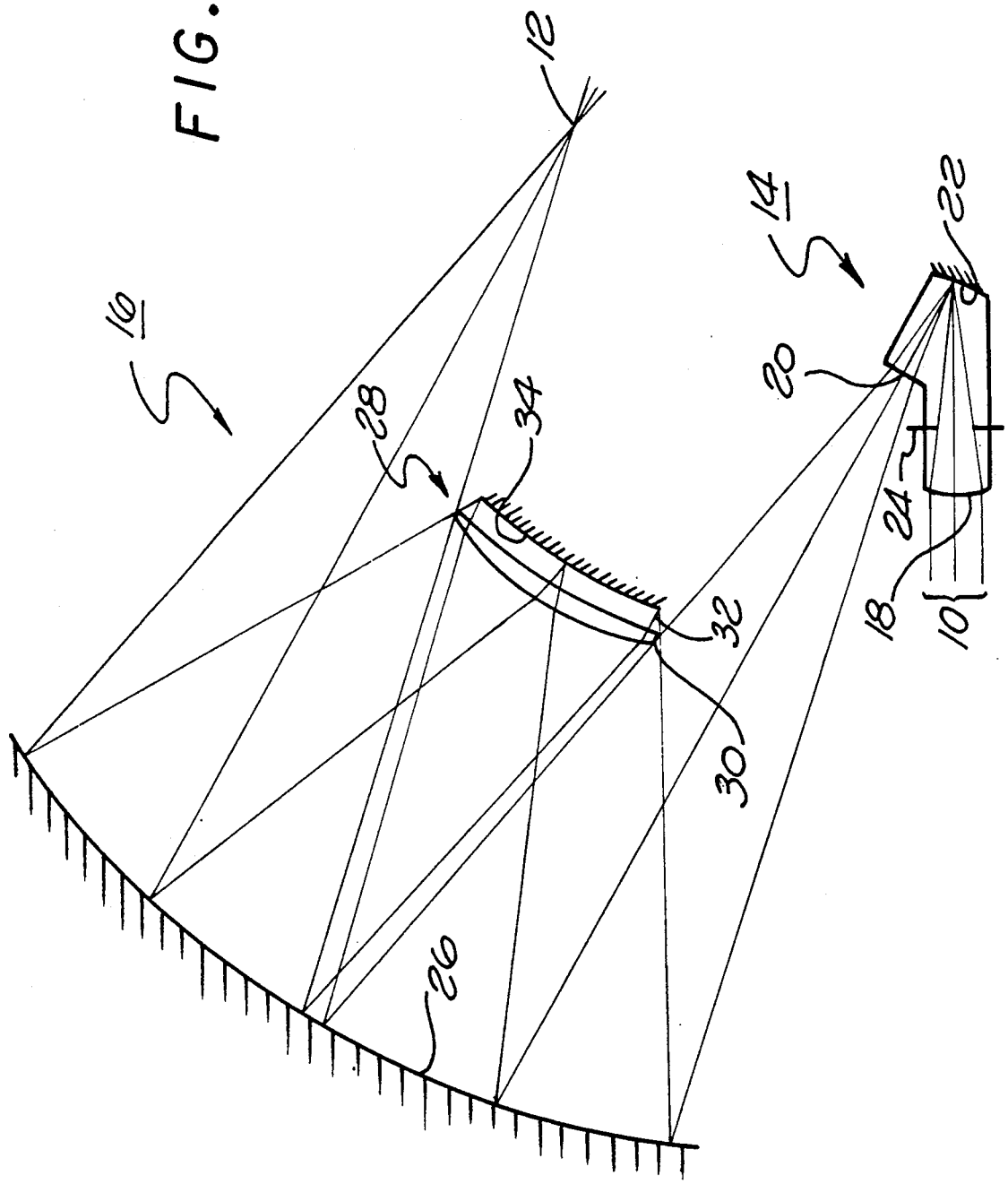
FIG. 1 is a schematic diagram of the lens system of the invention.

Turning to the drawings, FIG. 1 is a schematic diagram of the lens system of the invention. Such a lens system is particularly useful for camera arrangements that require a relatively long clear space between the optical elements and the image focal plane without sacrificing the ability to focus upon objects that pass relatively close to the lens system. Numerous "inspection-type" applications that require color perception and, accordingly, large clear space to accommodate bulky beamsplitter prisms, are particularly suited to the use of a lens system in accordance with the invention.

The lens system of the invention may be adequately described with reference to the single FIGURE for a camera that employs linear (i.e. a single row of detector photosites) CCD sensors. Such cameras are particularly useful in applications employing a conveyor belt that moves a product (e.g. food) past the camera lens. However, it will be appreciated by those skilled in the art that the teachings of this invention may be extended in a straightforward manner to cameras that employ CCD or like sensors that process image fields comprising matrices of rows and columns of pixels by extension of the geometry of the lens system discussed herein to two orthogonal dimensions.

The system of the invention receives a bundle of rays 10 from a distant object and processes it to form an image at 12 that may, for example, be subsequently separated into its chromatic components by a beamsplitter for the purpose of deriving electronic video signals (e.g. via CCD sensors). The telocentric quality of the image formed at 12 allows for uniform wavelength separation with respect to CCD sensors associated with the beamsplitter.

The invention comprises two main elements, an input lens 14 and a relay lens system 16. The input lens 14 provides essentially all of the optical power of the system and corrects field aberrations while the relay lens 16 forms a real image from the flattened primary image output from the input lens 14 and corrects both th chromatic and spherical aberration in the primary image.

The input lens 14 includes a simple lens 18, an exit face 20 that may be flat or otherwise, and a concave mirrored back surface 22. The simple lens 18, which provides essentially all of the optical power of the system, has a short focal length (approximately 15 millimeters) and may have a semifield of approximately 23 degrees at f/2.4. The entrance pupil 24 is located at the center of curvature of the simple lens 18, thereby producing an image on a curved field that is free of lateral color, coma or astigmatism. Such image is field flattened by the mirrored, concave rear surface 22 of the input lens 14 which is located near the focal plane of the simple lens 18.

The concave surface 22 is inclined at an angle with respect to the axis of the simple lens 18. As such it separates the beam of light entering through the simple lens 18 from that reflected from the surface 22. The reflected beam then passes through the exit surface 20 to the relay lens system 16.

The concave surface 22 field flattens the image 10. As a consequence of its location at the focal plane of the simple lens 18, the surface 22 introduces small amounts of other aberrations. The field flattened virtual image from the input lens 14 includes a large amount of spherical and chromatic aberration due to the high optical power of the simple lens 18. By allocating substantially all of the optical power of the system to the simple lens 18, the relay lens system 16 may be a low power system for delivering a real image, corrected for aberrations, to the distant focus 12.

The relay lens system 16 comprises a concave mirror 26 that is positioned to accept the primary image from the input lens 14 and a Mangin mirror 28 that is located at the aperture stop of the system (where it can correct aperture aberration without substantially effecting field aberrations) and includes two optical elements 30 and 32 of differing indices of refraction and dispersion. The back element 32 of the Mangin mirror 28 includes a convex mirrored surface 34.

In operation, light from a distant object enters the lens system through the simple lens 18. A virtual image of the distant object is formed at the entrance pupil 24 at a point that is nearly concentric with the simple lens 18. The concave mirrored surface 22 of the input lens 14 flattens the image field and makes it telecentric. The mirrored surface 22 is tilted to separate the entering and exiting beams. The primary image is transmitted through the exit face 20 of the input lens 14 to the relay lens system 16.

The lens 18 is decentered from the axis of the relay lens system 16 to eliminate obscuration for a linear object. An expanding beam of light from the input lens 14 strikes the concave spherical mirror 26 and is reflected to the Mangin secondary mirror 34. The two element doublet 30 and 32 is made of glasses of differing indices of refraction and dispersion selected to correct axial aberrations in the image reflected from the input lens 14. The back element 32 of the doublet is mirrored, reflecting light back through the doublet and toward the spherical concave mirror 26. The mirror 26 forms the final image 12 several focal lengths beyond the Mangin secondary mirror 28.

Figure 2:
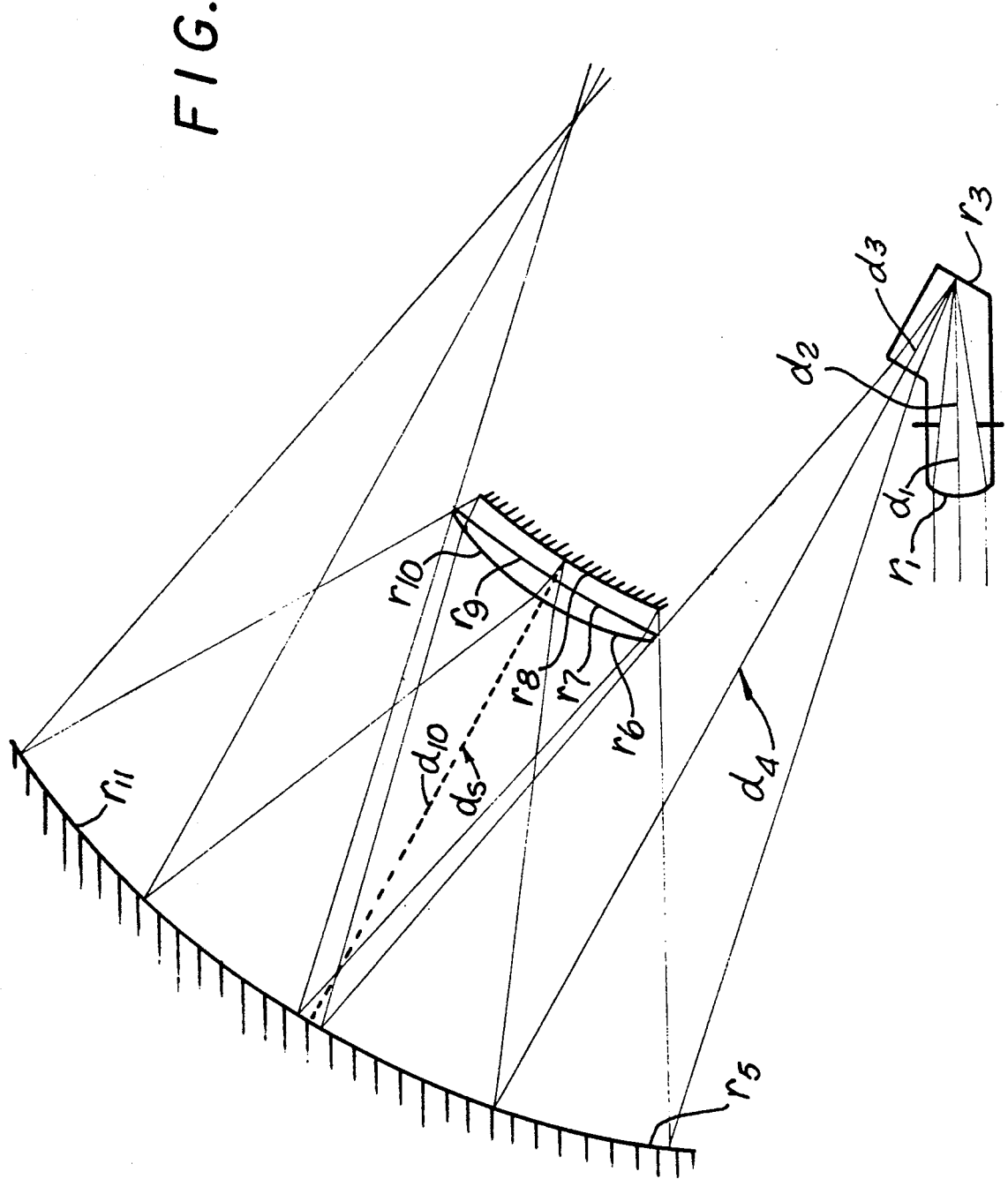
FIG. 2 is a schematic diagram of the invention including conventional optical notation for indicating the various surfaces and thicknesses referred to in an exemplary optical prescription.

The optical prescription for a lens system in accordance with the teachings of the present invention is as follows (distances are in millimeters; conventional optical notations, indicated on FIG. 2, are referred to in the prescription):

| EXAMPLE | | | |
|---|---|---|---|
| f/2.4, 23 degree semifield, 15 mm focal length | | | |
| $r_1 = 12.432$ | | | |
| | $d_1 = 6.927$ | $n_1 = 1.658$ | $v_1 = 32.9$ |
| $r_2 = $ infinity | | | |
| | $d_2 = 21.529$ | $n_2 = 1.658$ | $v_2 = 32.9$ |
| $r_3 = -31.486$ | | | |
| | $d_3 = -13.813$ mirror | | |
| | $d_4 = -114.563$ | | |
| $r_5 = 138.137$ | | | |
| | $d_5 = 63.667$ mirror | | |
| $r_6 = 45.581$ | | | |
| | $d_6 = 2.762$ | $n_6 = 1.517$ | $v_6 = 64.2$ |
| $r_7 = 103.186$ | | | |
| | $d_7 = 2.762$ | $n_7 = 1.740$ | $v_7 = 28.2$ |
| $r_8 = 66.612$ | | | |
| | $d_8 = -2.762$ mirror | | |
| $r_9 = 103.186$ | | | |
| | $d_9 = -2.762$ | $n_9 = 1.517$ | $v_9 = 64.2$ |
| $r_{10} = 45.581$ | | | |
| $r_{11} = 138.137$ mirror | | | |
| surface 3 tilted 15 degrees | | | |
| surface 5 decentered 27.627 | | | |

The present invention operates by taking advantage of a number of optical principles. First, as mentioned earlier, the simple lens 18 provides essentially the entire optical power of the system due to its relatively short focal length. While a short focal length lens will introduce a large degree of aberration, the location of the entrance pupil 24 near the center of curvature of the lens 18 assures that the chief ray will be undeflected at the surface of the lens 18 and that each off-axis bundle of rays will be aberrated by the lens 18 in the same way, resulting in an image that includes field curvature. The concave mirror 22 at the rear of the simple lens 14 flattens the incoming image and removes the field curvature. Since the concave mirror 22 is located at the focal plane of the lens 18, no coma or astigmatism is introduced into the reflected image. Accordingly, the lens system 14 of the invention eliminates field aberrations leaving spherical and chromatic aberrations only.

Axial (chromatic and spherical) aberrations are corrected by the (Offner-type) relay lens system 16 that forms a real image from the flattened primary image. Due to the allocation of the optical power of the system to the simple lens 18, the relay lens system 16 can utilize a Mangin lens of much lower power than the total system power having optical elements 30 and 32 of relatively large radii that correct the axial aberrations and do not introduce field aberrations. Design involves the selection of glasses of appropriate indices of refraction and dispersion, and proper dimensioning of the thicknesses and radii of the elements 30 and 32. Numerous solutions can be calculated whereby the relatively large Mangin mirror 28 will correct spherical and chromatic aberrations introduced by the simple lens 18. The absence of field aberration in the simple lens 18 and the large field of the relay lens system 16 allow the invention to function over a large field despite the absence of symmetry caused by the tilt of the field flattening mirror.

The aperture stop is located at the mirrored surface 34 of the Mangin mirror 28 and is imaged bY the mirrors 22 and 26 at the center of curvature of the first surface of the system 16. The magnified image of the entrance pupil on surface 34 allows a relatively weak Mangin mirror to correct the aberration of surface 18. Other combinations of glasses and radii of the elements 30 and 32 can provide equivalent aberration correction.

While this invention has been disclosed with reference to its presently preferred embodiment, it is not limited thereto. Rather, this invention is limited only insofar as defined by the following set of claims and includes within its scope all equivalents thereof.

What is claimed is:

1. A lens comprising, in combination:
   (a) an input lens having a focal length and including a simple lens for receiving an image;
   (b) said input lens including a mirrored back surface, said mirrored surface being concave for optically flattening the received image and projecting said flattened virtual image in a predetermined direction;
   (c) a concave mirror for reflecting said virtual image to a Mangin mirror; and
   (d) said Mangin mirror being positioned in opposed relation to said concave mirror and at the aperture stop of said lens system so that said image is reflected from the back surface thereof to said concave mirror and then reflected from said concave mirror to a predetermined focus.

2. A lens system as defined in claim 1 wherein said Mangin mirror further comprises:
   (a) a first optical element of a first index of refraction and a first index of dispersion;
   (b) a second optical element of a second index of refraction and a second index of refraction;

(c) said first and second optical elements being in optical contact along a common surface;

(d) the surface of said first optical element opposed to said common surface being arranged to receive said virtual image and the surface of said second optical element opposed to said common surface being mirrored to reflect said virtual image; and (e) said first and second optical elements being chosen so that said Mangin mirror corrects said virtual image for chromatic and spherical aberrations.

3. A lens system as defined in claim 2 wherein the back focal length of said lens system is at least three times the focal length o said simple lens.

4. A lens system as defined in claim 3 wherein said concave mirrored back surface of said input lens is inclined with respect to said simple lens.

5. A lens system as defined in claim 4 wherein said concave mirrored back surface of said input lens substantially coincides with the focal plane of said simple lens.

6. A lens system as defined in claim 5 wherein the entrance pupil of said input lens is located at the center of curvature of said simple lens.

7. A lens system arranged as defined in claim 6 so that substantially all of the optical power thereof is allocated to said simple lens.

8. A lens system as defined in claim 7 wherein the mirrored surface of said Mangin mirror is convex.

9. A lens system as defined in claim 8 wherein the focal length of said simple lens is approximately 15 millimeters.

10. A lens system as defined in claim 9 wherein the semifield of said simple lens is approximately 23 degrees.

* * * * *